FIG. I
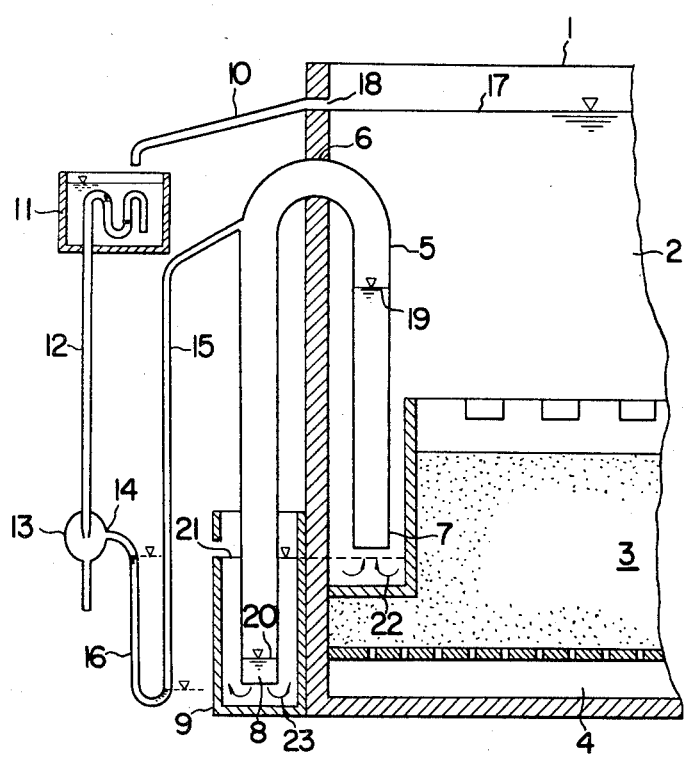
INVENTOR.
YOSHIHIKO UEDA
BY
*H. Edward Mestern*

March 24, 1970  YOSHIHIKO UEDA  3,502,212
AUTOMATIC WASHING SYSTEM WITH SIPHON FOR LIQUID FILTER CELLS
Filed July 12, 1967

INVENTOR.
YOSHIHIKO UEDA
BY
H. Edward Mestern

March 24, 1970     YOSHIHIKO UEDA     3,502,212
AUTOMATIC WASHING SYSTEM WITH SIPHON FOR LIQUID FILTER CELLS
Filed July 12, 1967     9 Sheets-Sheet 7

United States Patent Office

3,502,212
Patented Mar. 24, 1970

3,502,212
AUTOMATIC WASHING SYSTEM WITH SIPHON
FOR LIQUID FILTER CELLS
Yoshihiko Ueda, Yamaguchi-shi, Japan, assignor to Chiyoda Kako Kensetsu Kabushiki Kaisha, Tokyo-to, Japan, a joint-stock company of Japan
Filed July 12, 1967, Ser. No. 652,946
Claims priority, application Japan, July 15, 1966, 41/46,417; June 5, 1967, 42/35,447
Int. Cl. B01d 23/24
U.S. Cl. 210—98
11 Claims

ABSTRACT OF THE DISCLOSURE

A system having a siphon which is disposed below the limiting level of the filter cell liquid for discharging liquid out from a liquid filter cell to cause back-washing of a filter bed, the siphon being normally sealed at its open ends by liquid and containing entrapped air, which is compressed as the filter cell liquid rises, because of increasing the loss of head through the filter bed, until the liquid reaches a limiting overflow level, whereupon overflow liquid activates a hydraulically operated deaerating device to release the compressed air, thereby disrupting air-liquid pressure equilibrium in the siphon to accomplish automatic starting of siphoning action.

---

This invention relates to techniques and means for automatically back washing industrial filtration apparatuses.

Among the techniques known heretofore for automatically back washing filtration apparatuses, there are those of the character exemplified by the method and means described in U.S. Patent 2,879,891, in which automatic back washing of a filtration apparatus is accomplished through the use of a siphon tube having automatic starting means.

The means for these techniques have operated on a principle whereby the increase in the resistance to liquid passing through the filter bed progressively accompanying continuous filtering service is detected from the rise in the liquid level within the filter cell or basin (or the rise in the pressure within the filter compartment in an enclosed type filtration apparatus), or, by causing surplus liquid due to the rise in the liquid level to flow downward, a suction is created in an ejector to draw off air and to produce partial vacuum within the siphon tube and thereby to produce a siphoning action, whereby the filter basin liquid is discharged outside of the filter, and at the same time, liquid for back-washing from a separately installed tank is caused to flow into the basin from the under-drain chamber, thereby to carry out reverse-flow washing (or back-washing to the bed).

In these techniques, there arises certain common problems. The basic problem is the starting of the siphon tube, that is, the problem of whether or not siphoning action can be positively produced in the siphon tube. As the liquid level in the filter basin or back-wash type rises, the liquid level within the siphon tube gradually rises and reaches the upper bend in the siphon tube, but, since the rate of rise in this liquid level is very low, the liquid overflowing past the bend and flowing downward also flows at a very low flow-rate and constitutes merely a continuous flow along the siphon tube wall, which flow does not reach a rate to produce siphoning action.

Accordingly, methods and supplementary means for positively producing siphoning action have heretofore been proposed. According to one such method, the liquid level within the siphon tube is raised by very rapidly evacuating the air within the tube through an evacuation pipe connected to the upper part of the siphon tube to create partial vacuum within the tube, and the large quantity of liquid thus made available is caused to flow downward at one time. According to another proposed method, positive creation of siphoning action is sought by providing deflectors on the parts of the siphon tube wall along which the liquid flows and thus causing this overflow liquid to disperse and become a spray, thereby increasing the volume of the liquid flowing downward.

While each of these methods can actually produce the intended result, the problem of whether or not continuous operation can be positively assured even under the condition that the supplementary means operates positively still remains unsolved.

It is an object of the present invention to solve the problems associated with known automatic washing method and means of the character referred to above.

More specifically, an object of the invention is to provide an automatic washing system for positively causing a filtration apparatus to undergo automatic self-washing, the system having a simple organization in which elements such as electrical components, moving machine parts, and metering instruments are not used, but the physical properties of a liquid and air are utilized.

Another object of the invention is to provide an automatic back washing system of the above stated characteristics having simple operation, the automatic starting and stopping of which being positively assured.

According to the present invention, briefly summarized, there is provided an automatic back washing system in a liquid filtration apparatus having a filter cell with a filter bed which can be back-washed by discharging liquid out of the filter cell, the system comprising: an inverted U-tube siphon for thus discharging liquid, which siphon has an inner limb with a lower open end normally submerged in and sealed by liquid in the filter cell and an outer limb with a lower open end normally submerged in and sealed by liquid in a sump outside of the filter cell, air being normally entrapped within the siphon and compressed as the filter cell liquid rises, air-liquid pressure equilibrium being normally maintained within the siphon irrespectively of the rise of the filter cell liquid; and a hydraulically operated deaerating device operating, when the filter cell liquid is caused to rise to a predetermined limiting level by increasing the loss of head through the filter bed during filtration, to release the entrapped air thereby to disrupt the equilibrium in the siphon and cause impelled starting of siphoning action of the siphon.

The nature, principle, details, and utility of the invention will be more clearly apparent from the following detailed description with respect to preferred embodiments of the invention, when read in conjunction with the accompanying drawings, in which like parts are designated by like reference numerals.

In the drawings:

FIG. 1 is a diagrammatic elevational view, in vertical section, indicating the fundamental principle of the invention;

Figure 2A:
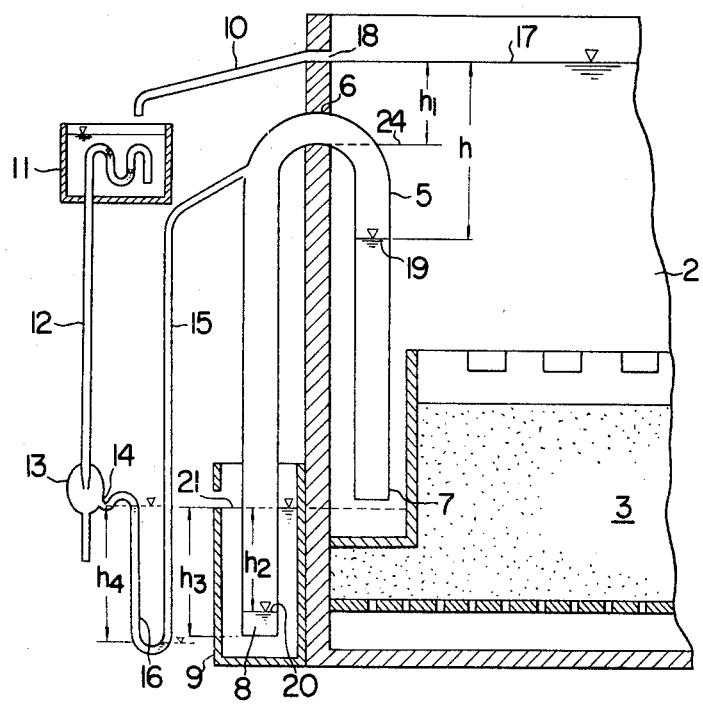
FIGS. 2a and 2b are respectively a view similar to FIG. 1 and a fragmentary elementary view for a description of the hydrodynamical features of the system shown in FIG. 1.

Referring first to FIG. 1, a basic form of the washing system according to the invention is shown diagrammatically therein as installed at one side of a filtration apparatus having a filter basin 1, in which the filtering liquid level is limited at level 17 by an overflow outlet 18. The washing system has a siphon tube 5 having an inverted U-bend 6 at a level below the limit level 17, an inner limb terminating at an open end 7 positioned within the filter basin liquid, and an outer limb terminating at an open end 8 positioned within the liquid in a discharged liquid sump 9.

An evacuating or deaerating pipe 15 is connected as branch line from an upper part of the outer limb of the siphon tube 5 and is directed downward to a liquid seal means 16, which is in the form of a trap in the system shown in FIG. 1. The outlet end of the deaerating pipe 15 communicates with a suction section 14 of an ejector 13. The aforementioned overflow outlet 18 communicates with a draining pipe 10 for conducting overflow liquid to an automatic cistern 11, from which a drain pipe 12 is directed to the nozzle of the ejector 13.

As the filtering service is continuously carried out in the filtration apparatus 1 through a filter bed 3, suspended substances in the liquid being filtered accumulate in the filter bed 3, whereby its resistance to flow of liquid therethrough progressively increases, and the level of the filter basin liquid 2 gradually rises. As the filter basin liquid level rises, the air accumulated in the siphon tube 5 is further compressed gradually.

At this point, the open ends 7 and 8 of the siphon tube 5 are submerged at specific depths within respective bodies of liquids, and the deaerating pipe 15 also has at its lower end a liquid seal means 16 of ample liquid column height. Therefore, all openings of the siphon tube 5 are sealed by liquid seals, whereby the air within the siphon tube cannot leak out even when it is further compressed.

Then, when the filter basin liquid level reaches the prescribed limiting level 17, the air within the siphon tube 5 is in a state of compression at maximum pressure. In this state, the pressure of the compressed air is in equilibrium with the hydrostatic heads of the liquid seals within the siphon tube, and it is possible to preserve the compressed air within the siphon tube.

On one hand, surplus liquid of the filter basin liquid which has reached the limiting level 17 overflows through the overflow outlet 18 and, passing through the draining pipe 10, flows into the automatic cistern 11, which is thereby started and discharges liquid. The liquid thus discharged flows down the drain pipe 12 and creates suction in the ejector 13, whereby the sealing liquid in the deaerating pipe 15 is drawn out, and the siphon tube 5 is thereby communicated with the outside atmosphere by way of the deaerating pipe 15.

Thereupon, the air which has been in the compressed state within the siphon tube 5 abruptly ejects out through the deaerating pipe 15 and is relieved of pressure. Simultaneously, the filter basin liquid rises in the inner limb of the siphon tube 5 and overflows at a relatively high flow-rate through the bend 6 of the siphon tube 5, whereby a siphoning action is instantly created in the siphon tube and causes the filter basin liquid to be discharged at a high flowrate into the discharged liquid sump 9.

As this discharge is continued, the filter basin liquid level drops until it reaches the level of the open end 7 of the siphon tube 5, whereupon air is drawn into the siphon tube through the open end 7 to disrupt the siphoning action, whereby the discharge of liquid is stopped.

The example of the organization illustrated in FIG. 1 indicates the fundamental principle of the present invention, and many changes and modifications can be made in this organization. That is, the construction of the automatic cistern 11, the overflow outlet 18, the liquid seal means of the deaerating pipe 15, and other elements and arrangements can be replaced by other means. For example, it is necessary for the excess liquid overflowing through the overflow outlet 18 in the system shown in FIG. 1 to flow continuously at a specific flowrate in order to cause the ejector 13 to operate in a positive manner. Accordingly, in the case of an overflow outlet of the construction illustrated in FIG. 1, the positiveness of the operation of the ejector can be expected through the use of the automatic cistern 11, but equivalent results can be obtained by another organization of the overflow outlet as illustrated in FIG. 3 constituting another embodiment of the invention.

Figure 3:
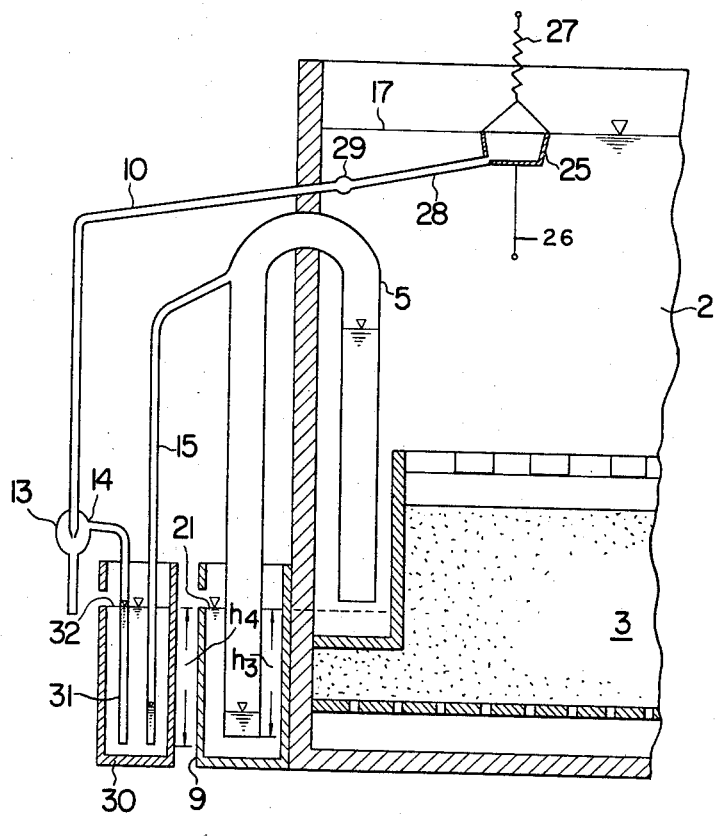
FIGS. 3, 4 and 5 are views similar to FIG. 1 showing other examples of preferred embodiment of the invention.

In the overflow device illustrated in FIG. 3, an overflow outlet vessel 25 of the shape of a dipper or ladle is connected at its bottom by a drain pipe 28 to an outer drain pipe 10a by way of a flexible joint 29 interposed between pipes 28 and 10a. The outlet vessel 25 is buoyant when empty of liquid and sinks when full of liquid. A stopping device 26 prevents the outlet vessel 25 from floating upward beyond a point at which its upper lip coincides with the limiting level 17 of the filter basin liquid, and a suspension device 27 limits the downward sinking movement of the outlet vessel 25. The vessel 25 is normally caused to float on the surface of the filter basin liquid.

When excess liquid overflows into the outlet vessel 25 at the upper limit of its flotation movement, the vessel 25 sinks, and a large quantity of liquid can thereby be caused to flow at one time down the drain pipe 10a. Therefore, an automatic cistern is unnecessary.

In reducing into practice the liquid discharge siphon system according to this invention, attention must be paid to the following points.

That is, referring to FIG. 2a showing the basic form of the present invention as illustrated in FIG. 1, the various differences in liquid levels and, therefore, the hydrostatic heads, are denoted as follows:

$h$ is the level difference between the filter basin liquid limiting level 17 and the upper level 19 of the liquid level within the inner limb of the siphon tube 5;

$h_1$ is the level difference between the overflow starting level 24 in the bend 6 of the siphon tube 5 and the limiting level 17;

$h_2$ is the level difference between the liquid level 20 within the outer limb of siphon tube 5 inserted into the discharged liquid sump 9 and the upper-limit normal liquid level 21 of the discharged liquid sump 9;

$h_3$ is the vertical depth to which the outer limb of the siphon tube 5 is submerged in the liquid at normal level within the discharged liquid sump 9; and $h_4$ is the effective hydrostatic height of the liquid seal at the lower part of the deaerating pipe 15.

For the intended operation of the washing system illustrated, it must be so organized that the following conditions are satisfied.

(1) $h \geq h_1$, therefore, $h = h_1$ becomes the limiting condition
(2) $h = h_2$, which is the equilibrium condition
(3) $h_3 \geq h_2$
(4) $h_4 > h_3$
(5) $h_3 \geq h_1$ Accordingly, in order to cause the liquid level within the inner limb of the siphon tube 5 to be held at the overflow starting level 24, the vertical depth $h_3$ to which the outer limb of the siphon tube 5 is inserted into the liquid at normal level within the discharged liquid sump 9 is made equal to or greater than level difference $h_1$ as specified by the above condition (5), whereby air compressed excessively by a rise in the liquid level 19 is caused to leak out through the open end 8 of the outer limb of the siphon tube 5 into the discharged liquid sump 9. At the same time, the liquid seal height, $h_4$ of the liquid seal trap 16 at the lower part of the deaerating pipe 15 of the system illustrated in FIGS. 1 and 2 must be greater than the depth $h_3$ as specified in the above condition (4), for the following reason.

If the height $h_4$ were equal to or less than the depth $h_3$ (that is, if $h_4 \leq h_3$), when the air within the siphon tube 5 has been excessively compressed by the rise of the liquid level 19 and is in a state of equilibrium in preparation for operation, a part of the sealing liquid within the liquid seal trap 16 would flow into the suction section 14 of the ejector 13, whereby the liquid sealing effect would be abruptly disrupted. Consequently, the compressed air within the siphon tube 5 would be released to the outside, whereby the siphoning action would be started. As a result, it would not be possible to attain a pressure balance of air and liquid, and the system would be unstable.

Another example of a siphon tube system embodying the present invention is shown in FIG. 3. This example differs from that illustrated in FIG. 1 in that an automatic cistern 11 is not necessary, as mentioned hereinabove, and in the construction of the liquid seal trap of the lower end of the deaerating pipe 15. That is, with the construction of a U-tube liquid seal trap shown in FIG. 1, it is necessary that $h_4 > h_3$, as explained above, and, moreover, the effect of liquid sealing of the deaerating pipe 15 is disrupted simultaneously with the operation of the ejector 13.

The liquid seal trap shown in FIG. 3 comprises a liquid seal vessel 30 filled with liquid to a normal overflow level 32, the lower open end of the deaerating pipe 15, and the lower open end of a suction pipe 31 communicating at its upper end to the suction section of the ejector 13, the pipes 15 and 31 being inserted into the liquid within the vessel 30 with their ends at a specific submerged depth $h_4$. This liquid seal trap operates as a liquid seal device and, at the same time, is not subject to the above considered condition, that is $h_4 > h_3$.

The reason for this is that the air within the siphon tube 5 which has been excessively compressed by the rise in the level of the filter basin liquid does not escape through the open end 8 of the outer limb of the siphon tube 5, and, even if the air leaks through the lower end of the deaerating pipe 15 into the liquid in the liquid seal vessel 30, the liquid level 32 in the vessel 30 does not change and it can be properly maintained. Also, in the case of performing liquid sealing of the deaerating pipe 15 as shown in FIG. 3, the aforementioned conditions of $h_4 \geq h_1$ and $h_3 \geq h_1$ must, of course, be satisfied.

In the example systems illustrated in FIGS. 1, 2, and 3, the sealing liquid in the discharge liquid sump 9, the liquid seal trap 16, and the liquid seal vessel 30 are discharged outside together with each operation of the ejector 13. However, since a portion of the filter basin liquid, at the time of starting of the operation of the siphon tube 5, branches off and flows down through the deaerating pipe 15, the sealing liquid are continuously replenished, whereby the sealing liquid levels 21 and 32 are maintained, and successively repeated operation is made possible.

Figure 4:
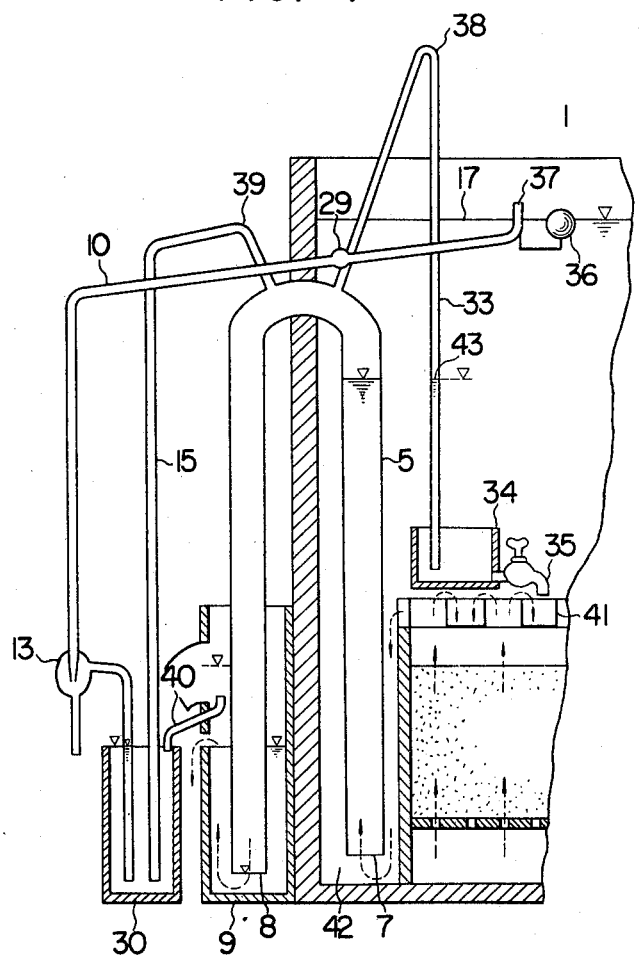

In still another embodiment of the invention as illustrated in FIG. 4, there is provided an overflow outlet 37 formed perpendicularly to the liquid level 17 and connected through a pipe 28 and by way of a flexible joint 29 to a drain pipe 10. The overflow outlet 37 is vertically actuated by a sinkable float 36 fixed thereto and having an upper opening. When the filter basin liquid level rises above the rim of the float 36, and surplus liquid flows thereinto, the float 36 immediately sinks below the liquid level and causes the surplus liquid to flow at a continuous high flowrate through the drain pipe 10 to an ejector 13 similarly as in the system illustrated in FIG. 3.

The siphon tube 5 in the system shown in FIG. 4 is provided at the upper part of its inverted U-bend with an opening communicating with one end of siphon breaker 33, which rises upward in the filter basin to a bend 38 at a position substantially higher than the filter basin limiting liquid level 17 and is then directed downward to an open end within a time adjusting vessel 34 disposed above a trough 41 in the filter basin liquid. As the siphon tube 5 operates, the filter basin liquid level drops below the time adjusting vessel 34, but the residual liquid in the vessel 34 prevents the siphon breaker 33 from operating immediately. A valve 35 is connected to the vessel 34 to permit the residual liquid to leak out gradually, whereby, after the elapse of a predetermined time, the open end of the siphon breaker in the vessel 34 is exposed to atmospheric air and, simultaneously, the sealing liquid within the siphon breaker 33 flows out to draw in air to stop the operation of siphon tube 5.

Accordingly, by thus positioning the bend 38 of the siphon breaker 33 higher than the limiting level 17 of the filter basin liquid, and higher than the negative pressure caused during the operation of the siphon, it becomes possible to prevent the liquid within the time adjusting vessel 34 from being drawn out, or the discharge liquid from being branched off and flowing downward from the siphon tube 5, during the operation of the siphon tube 5.

Thus, the above described system affords adjustable control of the starting and stopping of the operation of the siphon tube 5 in accordance with a preset time limit irrespective of the depth at which the inlet opening 7 of the siphon tube 5 is positioned and thereby makes possible logical and economical back-washing processes without unnecessary continuation of liquid discharging in cases such as that described hereinafter in which liquid for back washing is derived from another liquid source.

A further feature of the system illustrated in FIG. 4 is that surplus liquid in the discharged liquid sump 9 is drained off through an overflow pipe 40 to replenish the sealing liquid in the liquid seal vessel 30, whereby it is possible to use an arrangement wherein discharged liquid does not branch off and flow through the deaerating pipe 15 at the time of operation of the siphon tube 5.

Figure 5:
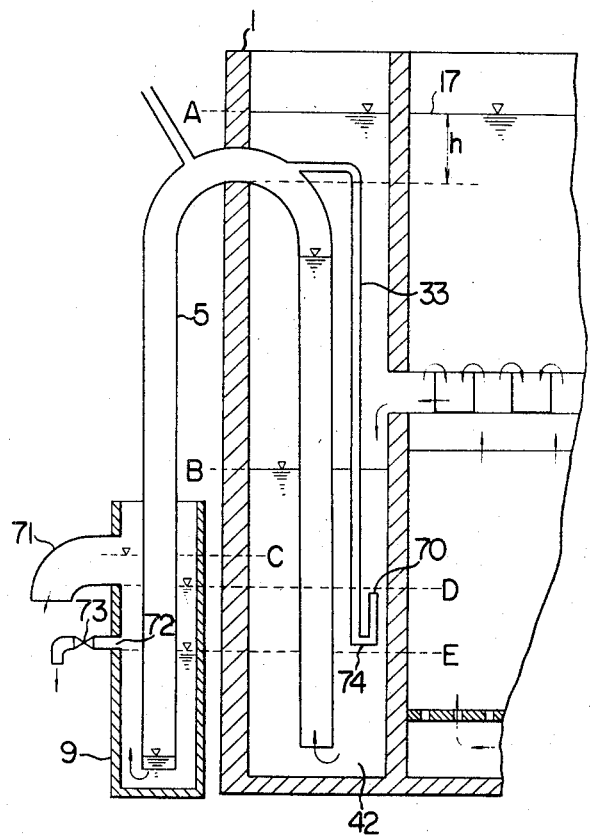

In other embodiments of the invention as illustrated in FIG. 5, a discharge liquid sump 9 has on its side wall an outlet 71 having large diameter at the upper part thereof and another outlet 72 having small diameter at the lower part thereof. The siphon tube 5 has an outer limb, the lower part of which being submerged in the discharge liquid sump 9, an inverse U-shaped bend at its top, and an inner limb submerged in liquid in a discharge chamber 42. A siphon breaker 33 is branched from the top bend portion of the siphon tube down into the liquid in the discharge chamber, the end portion thereof being U-shaped and having an open end 70. Such construction is advantageous in maintaining the siphoning action until such time that the back washing liquid flows into the discharge chamber 42 subsequent to back-washing of the filter layer, as well as in eliminating various uncertain factors to be caused during operation of the siphon system.

In the construction of the siphon tube 5 shown in FIGS. 1, 2, and 3, it is necessary that an open end 7 of the siphon tube 5 be disposed at a position higher than the liquid level 21 of a discharge liquid sump 9 so as to prevent the siphoning action from being hindered by back-water at the time when the siphon tube ceases its operation, with the consequence that the depth of submergence of the siphon tube into the discharge chamber becomes inevitably shallow, which apprehensively causes danger of giving various obstacles to the siphon system under actual operation, as mentioned hereinbelow.

(1) Discharge liquid flowing down from the trough 41 to the discharge chamber 42 produces foams which are sucked in the siphon tube to interrupt the siphoning action.

(2) When, during back-washing, the quantity of liquid to flow into the discharge chamber 42 decreases, the open end 7 draws in air to interrupt the siphoning action.

(3) The quantity of discharge liquid to flow into the discharge chamber 42 and the quantity of discharge liquid to outside by the siphon tube is difficult to be brought into equilibrium, hence the operation of the siphon system becomes unstable.

The preceding disadvantages derived from the depth of insertion of the siphon tube 5 into the discharge chamber can be removed by inserting the open ends 7 and 8 of the siphon tube 5 deep into the liquid as shown in FIG. 5.

That is, as the siphon tube becomes actuated, the liquid level A of the discharge chamber 42 begins to abruptly lower and reaches a point indicated by D by way of the liquid level B. During this period, the discharge liquid within the discharge liquid sump 9 is released in a large quantity from the outlet 71 of larger diameter to keep the level near C. After the liquid level reaches the point D, the discharge liquid is discharged in very small quantity from the outlet 72 of small diameter disposed at the lower part of the sump 9, with the consequence that a long time will be necessary until the level reaches the point E. As soon as the liquid level E is reached, discharge of liquid from the sump 9 completely ceases, thereby the liquid level becomes stable, and, at the same time, the liquid level of the discharge chamber stabilizes at the same level as that of the sump 9. The giving and receiving of liquid, even when the siphon tube is filled with liquid, is stopped. Consequently, the liquid levels D and E are to give the abovementioned waiting time, the liquid level during the normal operation existing between the level B and D.

The siphon breaker 33 operates in the following manner: when back washing liquid is to be fed from a separate vessel, the liquid level in the discharge chamber becomes lower than the level B as the quantity of back washing liquid to flow in decreases until it approaches to the level D, whereupon the liquid level in the U-shaped tube at the extreme end of the siphon breaker 33 lowers keeping the same liquid level as that in the discharge chamber 42. When the liquid level in the siphon breaker becomes lower than the bottom 74 of the U-shaped tube the open end 70 of the breaker 33 draws in air abruptly to remove the siphoning action of the siphon tube 5, thereby stopping the liquid discharge. At this time, the back-water in the siphon tube as well as a part of surplus liquid in the trough 41 flow down to raise the liquid level in the discharge chamber 42. However, since the extreme end of the siphon breaker 33 is in U-shape as mentioned above, the siphon tube can always be maintained at an atmospheric pressure at the time of stopping of the siphon tube without the open end 70 being submerged in the liquid.

It is to be noted that the open end 70 and the bottom part 74 of the siphon breaker 33 should be disposed between the liquid levels D and E.

While the foregoing description relates to siphon systems according to the invention having automatic starting and stopping means and adapted to discharge filter basin liquid, the invention will now be described with respect to examples of embodiment thereof as applied to specific filtration apparatuses.

Figure 6:
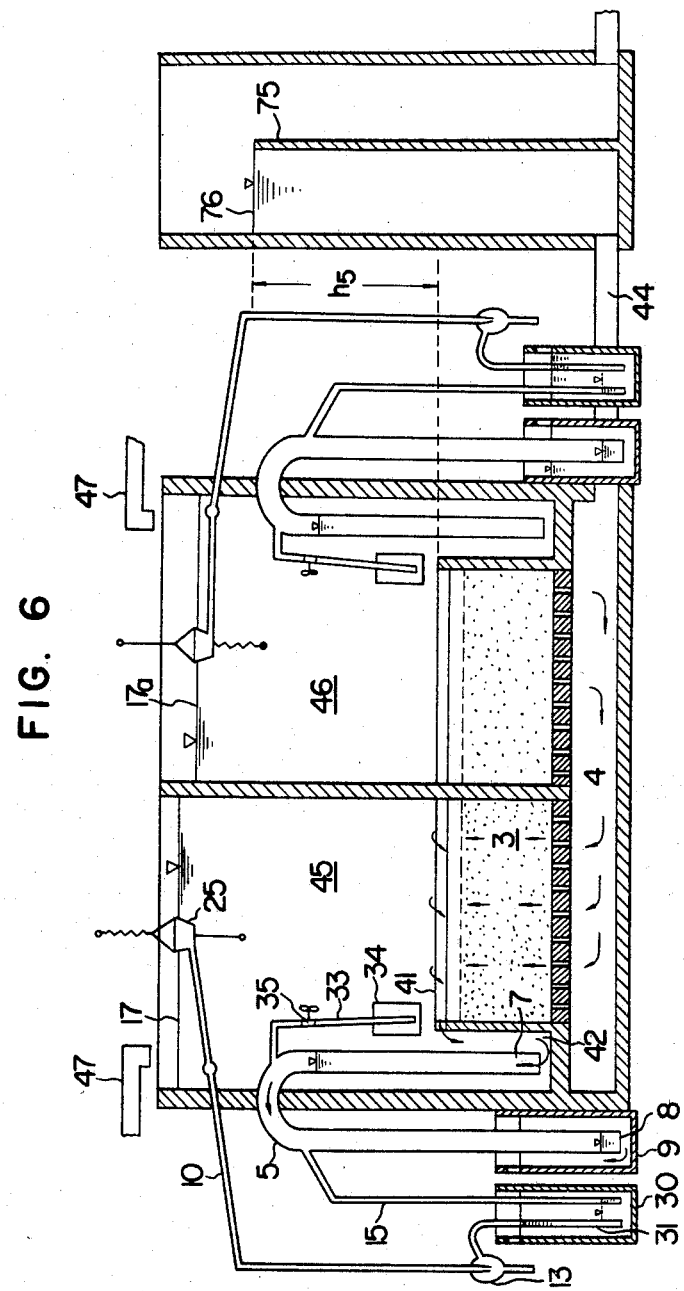
FIGS. 6, 7, 8, and 9 are views similar to FIG. 1 showing further and more concrete examples of systems embodying the invention.

FIG. 6 illustrates an application of the system of the invention to a combination of filter basins 45 and 46 exemplifying a parallel arrangement of a plurality of unit filter cells or basins having a common under-drain chamber 4. The under-drain chamber 4 communicates with a filtered liquid pipe 44 for draining out the filtrate during normal filtering service for which liquid to be filtered is supplied through supply pipes 47, 47 respectively to the filter basins 45 and 46.

When, during parallel operation of these filter basins, the loss of head through one of the filter basins, for example, filter basin 45 on the left-hand side as viewed in FIG. 5, increases, and the filter basin liquid surface reaches the limiting level 17, the overflow outlet 25 sinks below the liquid surface, and the surplus liquid flows at one time through the outlet 25 and down the drain pipe 10 to cause the ejector 13 to operate, as described hereinbefore. Consequently, suction is applied to the suction pipe 31 to draw out the sealing liquid within the liquid seal vessel 30. The drawing of the sealing liquid results in a weakening of the liquid sealing effect at the lower end of the deaerating pipe 15 until, finally, the pipe 15 is communicated with the atmosphere, whereby the compressed air within the siphon tube 5 escapes through the deaerating pipe 15, and the pressure within the siphon tube 5 returns to atmospheric pressure. At the same time, filter basin liquid flows into the open end 7 of the inner limb of the siphon tube 5 to start siphoning action, whereby the liquid in the filter basin 45 is siphoned and discharged through the other open end 8 of the siphon tube 5 into the discharged liquid sump 9.

As the operation of the siphon tube 5 continues, the liquid level of the filter basin 45 progressively descends, and a differential hydrostatic head $h_5$ is produced between the liquid level of the filtered liquid defined by a partition wall 75 to accommodate the filtered liquid and the upper end of a trough 41. Consequently, this differential hydrostatic head $h_5$ produces a liquid flow in the direction indicated by the arrows in the common under-drain chamber 4 to impart a back-wash liquid flow (as indicated by further arrows) in the upward direction through the filter bed 3 from its bottom. The resulting contaminated liquid flows into a trough 41, thence into the discharge liquid chamber 42 surrounding the open end 7 of the siphon tube 5, and is then discharged outside of the system by the siphon tube 5.

During this operation, a siphon breaker 33 connected to the siphon tube 5 operates in the aforedescribed manner. That is, it continuously draws out the residual liquid in a time adjusting vessel 34 provided at the lower end thereof and, after a predetermined time has elapsed, completes the action of drawing out the residual liquid and sucks in air from its open end, thereby stopping discharge of liquid by breaking the siphoning action of the siphon tube 5. In this FIG. 5, the reference numeral 44 denotes a communicating pipe for the filtered liquid, 47 is a pipe for supplying liquid to be filtered, and 35 is a valve for adjusting liquid flow-out.

Figure 7:
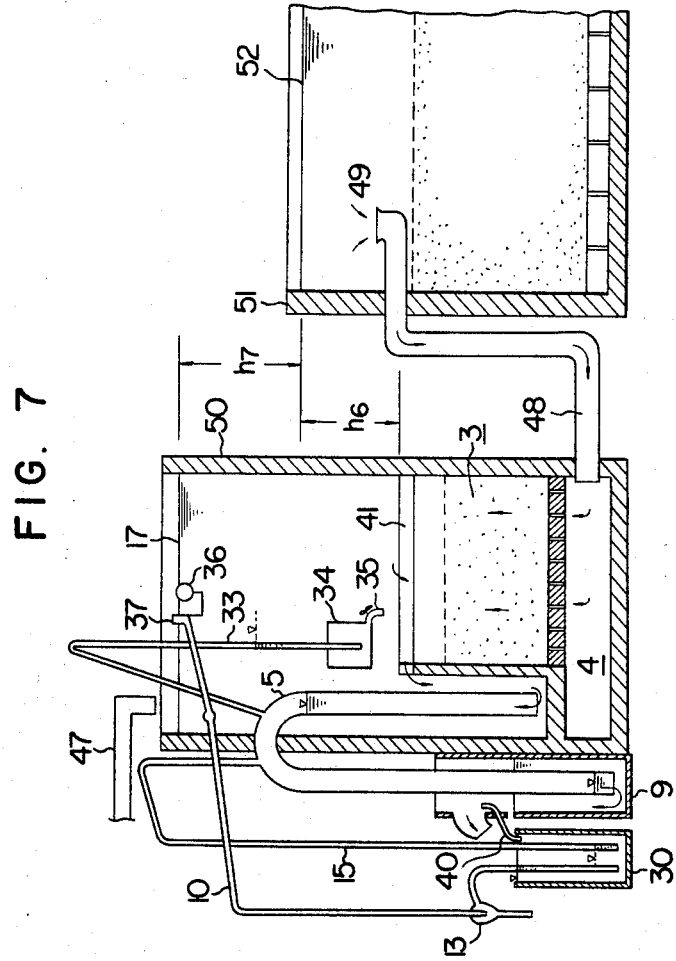

In another embodiment of the invention as illustrated in FIG. 7, the siphon system of the invention is applied to a high-speed filter basin 50 which, in series combination with a low-speed filter basin 51, constitutes a two-stage filtration apparatus. The high-speed filter basin 50 is provided with a supply pipe 47 for introducing liquid to be filtered during normal filtering service. The underdrain chamber 4 of the high-speed filter basin 50 is communicatively connected to the upper part of the low-speed filter basin 51 by a pipe 48 having an open end 49 in the low-speed filter basin 51.

When, during filtering service, the liquid surface in the high-speed filter basin 50 reaches the limiting level 17, an overflow device for starting siphoning action similar to that shown in FIG. 4 operates. That is, a sinkable float 36 sinks below the liquid surface, and a large quantity of surplus liquid overflows through an overflow outlet 37, thence through a drain pipe 10, to operate an ejector 13 at the lower end of the pipe 10, whereupon the liquid seal liquid in a liquid seal vessel 30 is drawn out, whereby the liquid seal at the lower end of a deaerating pipe 15 is removed, and the compressed air within the siphon tube 5 is released to the atmosphere. The siphon device is thereby started to siphon liquid from the high-speed filter basin 50 into a discharged liquid sump 9.

Discharging of liquid from the high-speed filter basin 50 results in a progressive drop in the liquid level in the filter basin 50, whereby a differential hydrostatic head $h_6$ is produced between the liquid level in the upper end of a trough 41 of the high-speed filter basin 50 and the liquid level 52 in the low-speed filter basin 51. As a result, the liquid in the low-speed filter basin 51 flows through the connecting pipe 48 in the arrow direction shown in FIG. 7 to establish an upward back-wash flow from the under-drain chamber 4 of the filter basin 50 through the filter bed 3 as indicated by arrows. The contaminated liquid resulting from this back-washing flows into the trough 41, as described above with reference to FIG. 6, flows down to a discharge chamber 42, and is discharged outside of the system by the siphoning operation of the siphon tube 5.

During this operation, the sealing liquid within the time adjusting vessel 34 of the siphon breaker 33 fitted on the siphon tube flows out of the valve 35, and, after lapse of a predetermined time, the sealing liquid is exhausted from the time adjusting vessel 34, whereupon the siphon breaker 33 operates to cause the sealing water to flow out of the open end thereof, and draws in air to stop liquid discharge of the siphon tube 5, thus the back-washing of the filter layer 3 is completed. Liquid to be filtered is then supplied again from supply pipe 47 to restart the filtering service.

Figure 8:
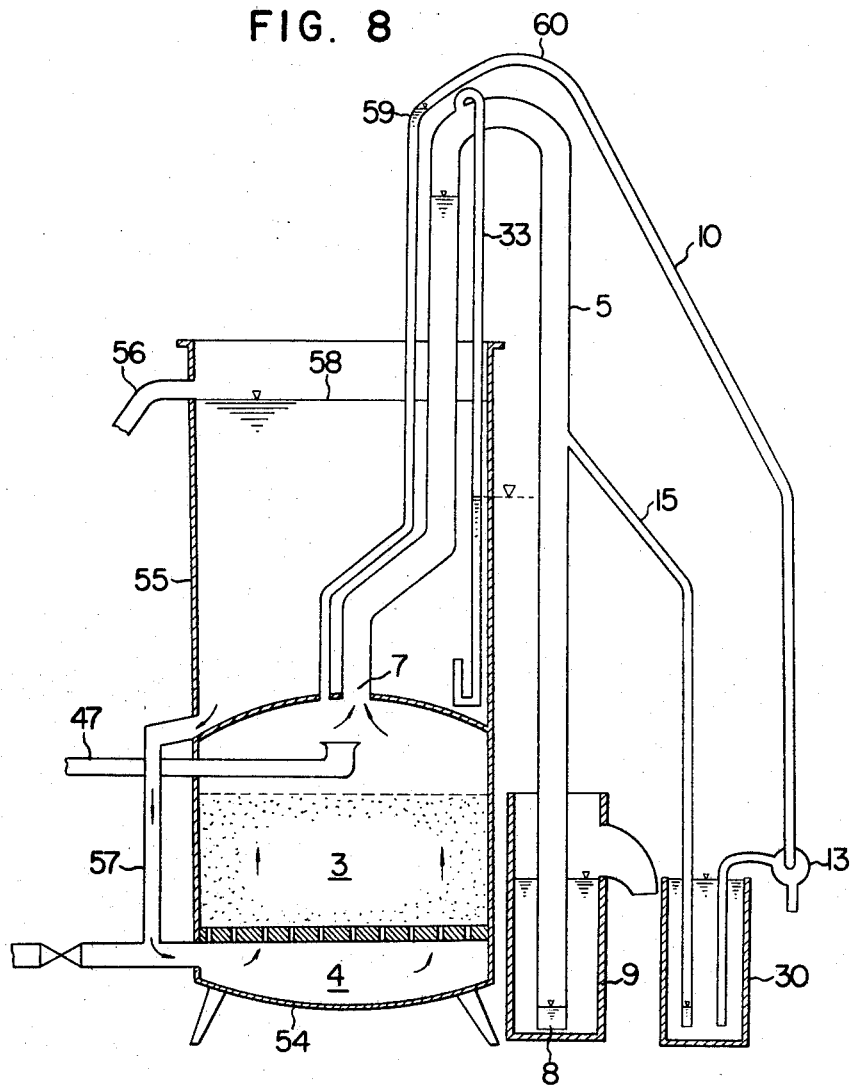

In a further embodiment of the invention as illustrated in FIG. 8, the system of the invention is applied to an enclosed type filtration vessel 54 of known type. As the loss of head through the filter bed 3 increases, and the internal pressure of the filter compartment increases, the liquid level 59 within a pipe 10a gradually rises until it reaches a bend 60 in the pipe 10a at a height coinciding with the limiting head for filtration, whereupon surplus liquid overflows past the bend 60 and flows down to operate an ejector 13 positioned at a lower part. Consequently, the sealing liquid within a liquid seal vessel 30 is drawn out, whereby the liquid seal at the lower end of a deaerating pipe 15 branched from a siphon tube 5 is removed, and the operation of the siphon tube 5 is started to discharge liquid from the vessel 54.

As the discharge of liquid is continued, the pressure within the filter compartment 54 decreases, and its equilibrium with the pressure of washing liquid stored in an upper reservoir 55 is disrupted, whereby the back washing liquid flows downward as indicated by arrows through a pipe 57, thence from the lower under-drain chamber 4 through the filter bed 3 to back wash the same. The resulting contaminated liquid is then discharged by the siphon tube 5 to the outside.

On the other hand, as the liquid level 58 of the back wash liquid in the reservoir 55 descends, the liquid seal at the lower end of a siphon breaker 33 is broken, and the siphon breaker draws in air, whereby the liquid discharging operation of the siphon tube 5 is stopped. Thereafter, as liquid to be filtered is supplied through a supply pipe 47, the pressure within the upper part of the filter compartment 54 is returned to normal operation pressure, and normal filtering service is restarted.

Figure 9:
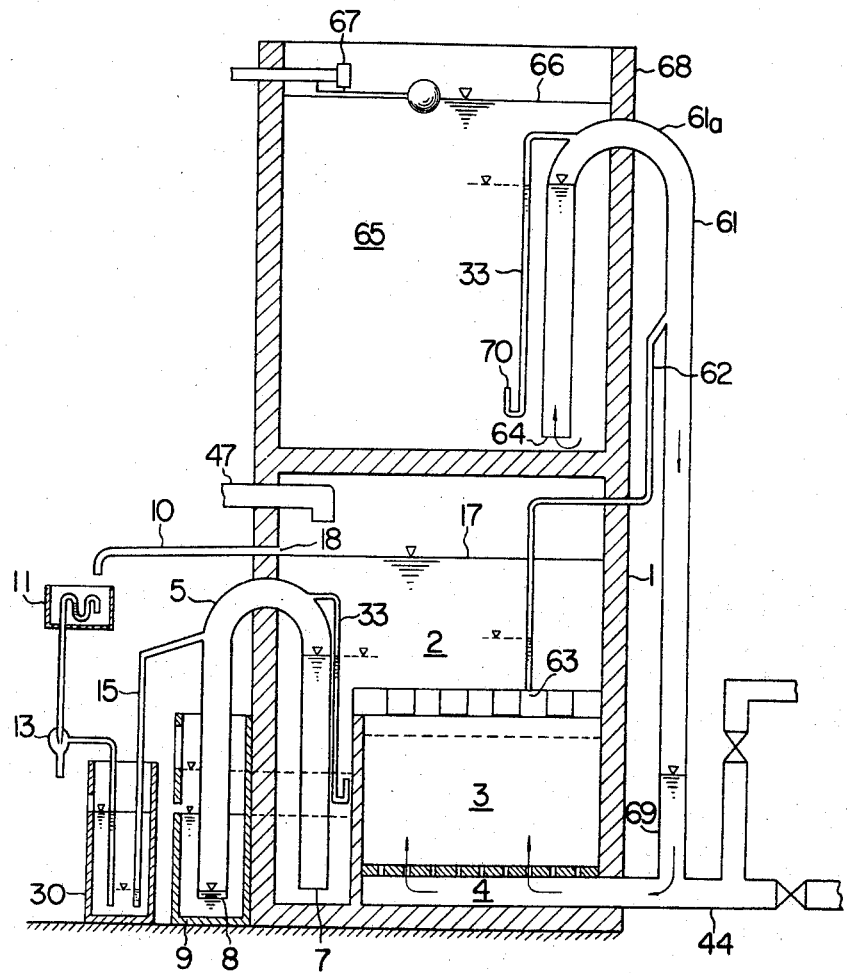

In a further embodiment of the invention as illustrated in FIG. 9, the system of the invention is applied to a filtration apparatus having a filter basin 1 above which a reservoir tank 68 for back-wash liquid is installed and communicated with the under-drain chamber 4 at the bottom of the basin 1 by a siphon tube 61.

Within the reservoir tank 68, back wash liquid 65 is accommodated to a level 66 determined by a liquid level regulating valve 67. The abovementioned siphon tube 61 for supplying back wash liquid has an inner limb with an open end 64 within the tank 68 near its bottom, an inverted U-bend 61a, and an outer limb communicating with the under-drain chamber 4 of the filter basin 1 through a liquid seal trap 69 at the lowermost part of the outer limb. A deaerating pipe 62 is connected as a branch line to the siphon tube 61 and directed downward to an open end 63 disposed within the liquid 2 in the filter basin 1 and provided with liquid seal means.

The filtration apparatus illustrated in FIG. 9 is further provided with a siphon system according to the invention for discharging filter basin liquid 2, the form of this siphon system as illustrated being the same as that described hereinbefore with reference to FIG. 1.

The automatic back washing system of the above described organization operates in the following manner. As the resistance to passage of liquid through the filter bed 3 accompanying continuous filtering service increases, the level of the filter basin liquid 2 rises until it reaches the limiting level 17, whereupon surplus liquid overflows through the overflow outlet 18 to start the automatic cistern 11, whereby the ejector 13 and deaerating pipe 15 operate as described hereinbefore to start the siphon tube 5. Thus, the filter basin liquid 2 is discharge into the discharged liquid sump 9.

Together with the discharging of the filter basin liquid and the resulting progressive lowering of its level in the basin 1, the liquid sealing effect of the liquid seal at the lower end 63 of the deaerating pipe 62 normally submerged in the filter basin liquid 2 weakens. Consequently, the compressed air within the siphon tube 61 for supplying wash liquid escapes through the open end 63 of the deaerating pipe 62, whereby the pressure within the siphon tube 61 is made approximate to atmospheric pressure, and, at the same time, siphoning action is started. The back wash liquid in the reservoir tank 68 is thereby supplied through the siphon tube 61 into the under-drain chamber 4 at the bottom of the filter basin 1 and thence flows upward as indicated by arrows to wash the filter bed 3.

On the other hand, as the back wash liquid is siphoned out of the reservoir tank 68, the level 66 of the back wash liquid in the tank 68 drops, whereupon air is drawn into the siphon breaker 33 branched out of the upper part of the siphon tube 61 and having a U-shaped open end 70 disposed of the bottom part at the wash liquid tank 68 but slightly higher than the open end 64 of the siphon tube 61, whereby the siphoning action of the tube 61 is removed and the liquid discharge is stopped.

Figure 2B:
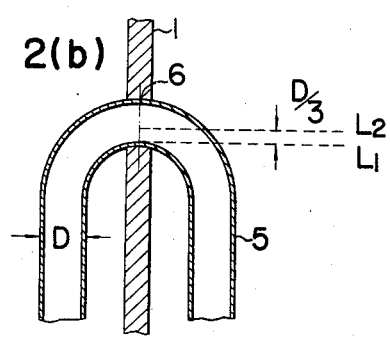

In the system according to the invention, the condition under which the siphon system will start is as follows. Referring to FIG. 2b, the siphoning action cannot start when the free liquid surface of the filter basin liquid is at or below a level $L_1$ coincident with the inside or lowest point of the inner surface of the siphon tube 5 at the highest cross-section of the inverted U-bend 6. When the free liquid surface is brought to a level $L_2$ which is higher than level $L_1$ by a vertical distance $D/3$ (where D is the inner diameter of the siphon tube 5), the siphoning action will positively start, as verified by experiments.

Accordingly, the condition for starting the siphon system according to the present invention covers all cases of application, wherein the limiting level 17 of the filter basin liquid is set at a position ranging from and including the level $L_1$ to any position thereabove.

As described above in detail with respect to preferred embodiments thereof, the present invention provides an automatic back washing system for filtration apparatuses in which system there is provided a siphon device, wherein the air remaining in a siphon tube after its two limbs have been liquid-sealed is increasingly compressed as the level of the filter basin liquid rises, air-liquid pressure equilibrium being maintained at any position within the limbs even when the filter basin liquid surface reaches the highest level, i.e., the limiting level, and the compressed air within the siphon tube is released to the atmosphere by removing the liquid seal of a deaerating pipe at the time of starting thereby to relieve the air pressure within the siphon tube and disrupt the air-liquid pressure equilibrium, whereby siphoning operation of the siphon tube is started abruptly with a single action.

Thus, the uncertainty of starting, which has been considered to be the major problem in siphon devices known heretofore, is eliminated by the practice of the present invention, and positive operation is assured by means of a relatively simple system in which, moreover, no electrical parts or machine moving parts are used, whereby operational failures are eliminated, and maintenance is facilitated.

What I claim is:

1. In a liquid filtration apparatus comprising a filter cell with a filter bed capable of being back-washed by a discharging liquid out of the filter cell; a discharge liquid sump disposed outside the filter cell; an inverted U-bent siphon tube communicatively disposed between said filter cell and discharge liquid sump with the inner limb thereof being normally submerged in and sealed by liquid in said filter cell at its lower open end and with the outer limb thereof being normally submerged in and sealed by liquid in said discharge liquid sump; an hydraulically operated deaerating device for actuating the siphon tube comprising an ejector, and a drain pipe with its one open end communicating with an outlet provided in coincidence with the limiting level of the filter cell liquid and with its other end communicating with said ejector, the improvement wherein said U-bent siphon tube is entirely disposed below the limiting level of the filter and a deaerating pipe having one open end communicating with the upper part of said siphon tube and with its other open end communicating with said ejector for breaking a liquid-seal provided in said deaerating pipe, whereby when air normally entrapped within the siphon tube is compressed as the level of liquid in the filter cell rises, air-liquid pressure equilibrium normally maintained at the height of the limiting level of the filter cell liquid as well as at any position within the inner and outer limbs of the siphon tube is disrupted upon the rise of the level of the filter cell liquid to reach the limiting level thereof and surplus liquid overflows from the outlet through the drain pipe down to the ejector to actuate the same and break the liquid seal within the deaerating pipe, and the siphoning action of the siphon tube is thus started.

2. The automatic back washing system as claimed in claim 1, in which the deaerating device comprises: an overflow outlet for discharging any surplus liquid above said predetermined limiting level; an automatic cistern for receiving said surplus liquid and operating thereby to supply a flow of actuating liquid; an ejector operated by said actuating liquid to create suction; a deaerating pipe communicating at one end to the other limb of the siphon tube at a part thereof; and a liquid seal device connected to the other end of the deaerating pipe and opened by said suction to release said air compressed in the siphon tube through the deaerating pipe.

3. In a liquid filtration apparatus of the type having a filter cell with a filter bed capable of being back-washed by discharging liquid out of the filter cell, an automatic washing system comprising, in combination: a siphon tube for thus discharging liquid, having an inner limb with a lower open end normally submerged in and sealed by liquid in the filter cell, an outer limb with a lower open end normally submerged in and sealed by liquid in a sump outside of the filter cell, and an inverted U-bend joining the upper end of the inner and outer limbs and which is disposed below the limiting level of the filter cell liquid, air being normally entrapped within the siphon tube and compressed as liquid in the filter cell rises, air-liquid pressure equilibrium being normally maintained within the siphon tube irrespectively of the rise of the filter cell liquid; and a hydraulically operated deaerating device operating, when the filter cell liquid is caused to rise to a predetermined limiting level by increasing the loss of head through the filter bed during filtering step, to release said air thus compressed in the siphon tube thereby to disrupt said equilibrium and cause impelled starting of siphoning action of the siphon tube, in which the deaerating device comprises: an open outlet vessel normally floating on the surface of the filter cell liquid but prevented from floating above a point at which its upper rim is coincident with the limiting level, whereby any surplus liquid above the limiting level causes an overflow of liquid into the outlet vessel to sink the outlet vessel and thereby causes further influx thereinto of liquid at a high flowrate; a pipeline permitting free movement of the outlet vessel and conveying said liquid at a high flowrate; an ejector connected to said pipeline and operated by said liquid thus conveyed to create suction; a deaerating pipe communicating at one end to the outer limb of the siphon tube at the upper part thereof; and a liquid seal device connected to the other end of the deaerating pipe and opened by said suction to release said air compressed in the siphon tube through the deaerating pipe.

4. In a liquid filtration apparatus of the type having a filter cell with a filter bed capable of being back-washed by discharging liquid out of the filter cell, an automatic washing system comprising, in combination: a siphon tube for thus discharging liquid, having an inner limb with a lower open end normally submerged in and sealed by liquid in the filter cell, an outer limb with a lower open end normally submerged in and sealed by liquid in a sump outside of the filter cell, and an inverted U-bend joining the upper ends of the inner and outer limbs and which is disposed below the limiting level of the filter cell liquid, air being normally entrapped within the siphon tube and compressed as liquid in the filter cell rises, air-liquid pressure equilibrium being normally maintained within the siphon tube irrespectively of the rise of the filter cell liquid; and a hydraulically operated deaerating device operating, when the filter cell liquid is caused to rise to be predetermined limiting level by increasing the loss of head through the filter bed during filtering step, to release said air thus compressed in the siphon tube thereby to disrupt said equilibrium and cause impelled starting of siphoning action of the siphon tube provided with a siphon stopping device for stopping the operation of the siphon when the descending filter cell liquid reaches a stop level higher than the level of the open end of the inner limb of the siphon tube, said device comprising: a siphon breaker pipe having a first limb communicating at its lower end to the U-bend of the siphon tube and a substantially vertical second limb with a lower open end at said stop level, the first and second limbs being joined at their upper ends at a bend positioned substantially above said predetermined limiting level for the filter cell liquid; a time adjusting vessel having an open top part and positioned so that the lower open end of the second limb of the siphon breaker pipe is disposed within said vessel at a short distance above the bottom thereof; and an adjustable means installed in the time adjusting vessel for gradually discharging liquid from said vessel, the lower end of said second limb being normally submerged in and sealed by liquid and being communicated to the atmosphere when the liquid in said vessel descends beyond said stop level, whereupon the siphon breaker pipe operates to apply atmospheric pressure to the U-bend of the siphon tube to stop the operation thereof.

5. The automatic back-washing system as claimed in claim 2, in which the liquid seal device connected to said other end of the deaerating pipe is a U-tube trap.

6. The automatic back-washing system as claimed in claim 3, in which the liquid seal device connected to said other end of the deaerating pipe is a U-tube trap.

7. The automatic back-washing system as claimed in claim 2, in which the liquid seal device connected to said other end of the deaerating pipe comprises a liquid seal vessel normally filled with liquid to an overflow level, said other end of the deaerating pipe disposed in said vessel and having a lower open end at a specific level below the overflow level, and a suction pipe communicating at its upper end to the suction section of the ejector and having a lower open end disposed in said vessel at a level lower than said specific level.

8. The automatic back-washing system as claimed in claim 3, in which the liquid seal device connected to said other end of the deaerating pipe comprises a liquid seal vessel normally filled with liquid to an overflow level, said other end of the deaerating pipe disposed in said vessel and having a lower open end at a specific level below the overflow level, and a suction pipe communicating at its upper end to the suction section of the ejector and having a lower open end disposed in said vessel at a level lower than said specific level.

9. The automatic washing system as claimed in claim 1 combined and operating cooperatively with separate means for supplying back washing liquid, said means being automatically and hydraulically started to supply back washing liquid to the filter bed in response to the discharging of the filter cell liquid.

10. An automatic back-washing system as claimed in claim 4, wherein the siphon breaker is U-shaped at the extreme end part thereof.

11. An automatic back-washing system as claimed in claim 1, wherein the discharge liquid sump is provided at the upper part of the side wall thereof with an outlet of larger diameter and at its lower part with an outlet of smaller diameter, whereby, when no back-washing liquid is supplied even after complete discharge of the liquid in the sump from the outlet of larger diameter, the siphoning action of the siphon tube is prevented from stoppage, for the time until the back-washing liquid is supplied, by discharging the liquid from the outlet of smaller diameter.

References Cited

UNITED STATES PATENTS

| | | | |
|---|---|---|---|
| 2,879,891 | 3/1959 | Beohner et al. | 210—275 X |
| 2,879,893 | 3/1959 | Stebbins | 210—108 |
| 3,111,486 | 11/1963 | Soriente | 210—108 |

REUBEN FRIEDMAN, Primary Examiner

JOHN W. ADEE, Assistant Examiner

U.S. Cl. X.R.

210—108, 277